Jan. 27, 1948. W. C. TROENDLE 2,435,022
BABY WALKER
Filed Aug. 2, 1945 2 Sheets-Sheet 2
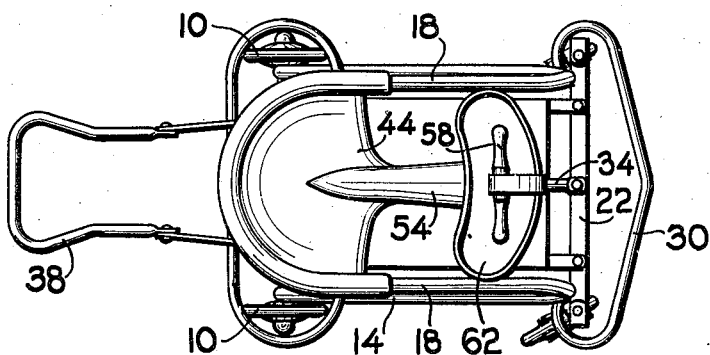
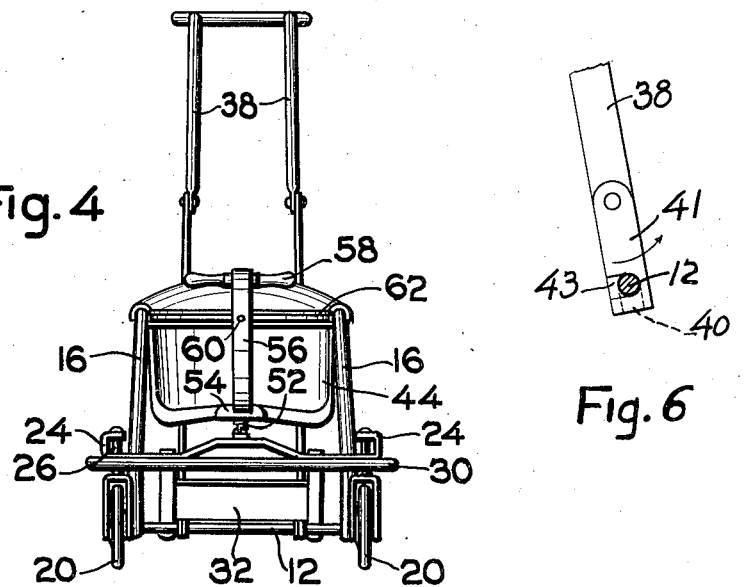
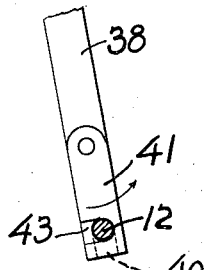
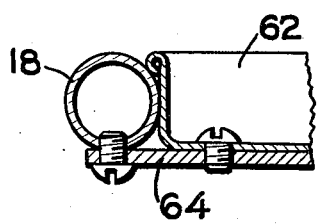
INVENTOR.
WILLIAM C. TROENDLE
BY
Charles R. Fay
atty.

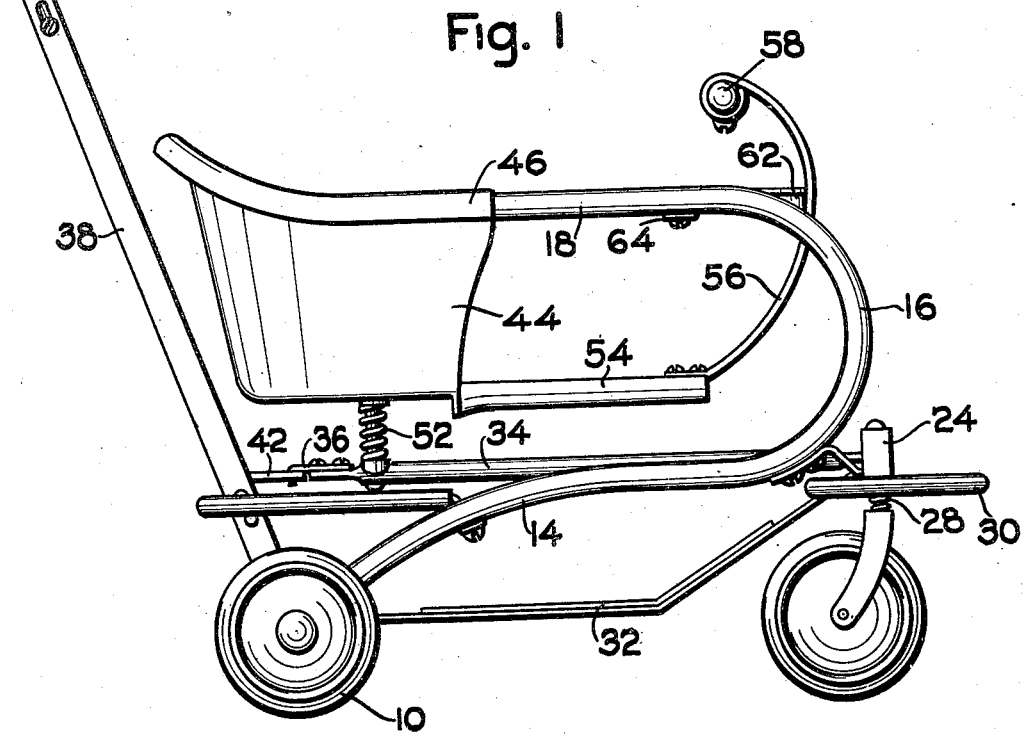
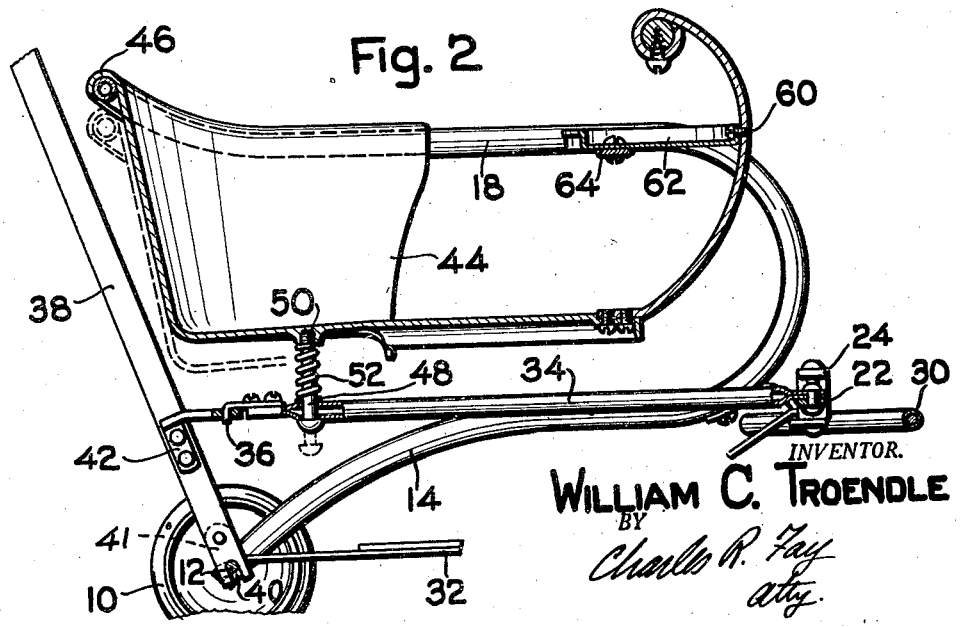

Patented Jan. 27, 1948

2,435,022

UNITED STATES PATENT OFFICE 2,435,022

BABY WALKER

William C. Troendle, Gardner, Mass., assignor to Thayer Company, Gardner, Mass., a corporation of Massachusetts Application August 2, 1945, Serial No. 608,426

9 Claims. (Cl. 280—47)

This invention relates to wheeled vehicles for infants, such vehicles being commonly known as baby walkers or strollers.

The principal object of the invention resides in the provision of a new and improved infant's vehicle of the type described embodying a lighter weight and at the same time more rigid and longer lasting construction; the provision of an infant's vehicle having a spring seat preferably in the form of a bucket type seat, mounted on a spring rod frame and embodying a lost motion supporting connection for a central longitudinal stabilizing rod directly under the seat, said rod also forming a connection point for a detachable pusher handle; and the provision of a bucket or other type of seat mounted on a spring rod frame and having a leg dividing extension suspended from a device at the forward end of the vehicle, said device being in the nature of a tray or the like.

Other objects and advantages of the invention will appear hereinafter.

Reference is to be had to the drawings, in which

Fig. 1 is a view in side elevation illustrating the invention;

Fig. 2 is a longitudinal section thru the device of Fig. 1;

Fig. 3 is a top plan view on a reduced scale;

Fig. 4 is a view in front elevation;

Fig. 5 is a detail of the tray support; and

Fig. 6 is a detail of the pusher connection to a wheel shaft.

As shown in the drawings, the present invention embodies a vehicle known as a baby walker and having a pair of rear wheels 10 mounted on a shaft 12 to which is secured the ends of a light weight spring frame in the form of a triple loop. The frame extends at both ends from the shaft 12 upwardly and forwardly as at 14 to a point at the front of the vehicle where it is curved reversely as at 16 forming a generally vertical loop, and then extends rearwardly in the form of a horizontal U or loop as at 18. The closed end of the horizontal loop will be seen to be springy as illustrated in dotted lines in Fig. 2 so that the occupant of the vehicle may spring up and down thereon.

At the front end of the vehicle there are provided a pair of swivel wheels 20 which are mounted to depend from a cross rod 22 by means of brackets 24, the latter mounting swivel pins 26 provided with springs 28 for the purpose of cushioning the front end of the carriage. A bumper 30 is arranged in any desired way but preferably on the cross rod 22. A removable foot support 32 may be mounted on the rear axle 12 and the cross rod 22.

A longitudinal central rod 34 is secured to the cross rod 22 and extends rearwardly therefrom terminating in a free end having a hook 36. A U-shaped removable pusher handle 38 is provided with notches 40 for detachable securement over the shaft 12, and this pusher is provided with a bracket 42 having an aperture therein for reception of the hook 36. Also, each leg of the pusher is provided with a pivoted link 41 having a bight 43 for reception of shaft 12 to firmly anchor the pusher. The pusher and rod 34 and cross rod 22 act as a stabilizer for the vehicle.

The seat is of the bucket type and this seat is generally indicated in the drawings at 44 and is provided with a curved flange 46 extending over the frame 18 at the closed end thereof. A pin 48 is secured to the bottom of the seat at 50 and extends through an opening in rod 34 for vertical movement therethrough (see Fig. 2). A spring 52 yieldingly maintains the rod 34 in position together with the head of pin 48. The seat 44 extends forwardly at 54 leaving a sufficient amount of leg room at either side thereof as seen in Fig. 3. The forward extension 54 is directly above the longitudinal rod 34. At the forward end of the extension 54 the latter is secured to a curved bar 56 which extends generally upwardly terminating in a handle for the occupant indicated at 58. The bar 56 is secured as at 60 to the tray or similar member 62 and a rod 64 extends across the bottom of the tray. The rod 64 in turn is secured to the U-shaped spring frame at 18 as shown in Figs. 1 and 2.

From the above it will be seen that this invention presents a new and improved construction in baby walkers, increasing the rigidity and stability thereof, providing a light weight but strong seat construction, and a novel and improved arrangement of the handle and spring support for the seat.

Having thus described my invention and the advantages thereof, I do not wish to be limited to the details herein disclosed, otherwise than as set forth in the claims, but what I claim is:

1. A device of the class described comprising a wheeled shaft, a spring rod frame having a triple loop form and a pair of ends, said frame being secured to the shaft at said ends, wheeled means supporting the frame at a point remote from the shaft, a seat suspended from the frame to spring therewith, a central extension on the seat, and means suspending said extension from the frame, said means comprising a generally vertical bar secured at the lower end thereof to the extension, and a member secured to the bar and extending substantially across and secured to the frame above the extension.

2. A device of the class described comprising a spring rod frame, wheels therefor, a seat suspended from the frame, a cross bar secured to the frame, a free-ended longitudinal rod secured at one end to the cross bar and extending under the seat, a resilient connection from the seat to the longitudinal rod, a pusher, and a connection between the pusher and the free end of the longitudinal rod to aid in supporting the latter.

3. The device of claim 2 wherein the pusher and rod connection is separable.

4. The device of claim 2, including a shaft for certain of the wheels, said pusher having a detachable connection to the shaft, and the pusher and rod connection being effective to prevent detachment of the pusher and shaft connection.

5. A baby walker comprising a generally U-shaped spring rod frame, a seat suspended from the frame at the closed end thereof, the arms of the U extending reversely to form a pair of loops, a wheeled shaft, the ends of the loops being secured thereto, a cross bar, wheels mounted on the cross bar, supporting connections between the cross bar and intermediate points on the loops, a rod secured to the crossbar and extending under the seat, a connection from the seat to the rod, and a detachable pusher handle to which the rod is attached.

6. A baby walker comprising a shaft, wheels thereon, a cross bar spaced from the shaft, wheels on the bar, a spring rod frame comprising a member in the shape of three open loops, wherein the center loop portion thereof is generally horizontal, said frame being supported at spaced points on the shaft and bar, the horizontal loop being free and resilient at its closed end, a bucket seat on the horizontal loop at the closed end thereof, a tray secured to both legs of the horizontal loop at a point spaced from the closed end thereof, an element secured to the tray and extending thereabove and below, a handle at the upper end of the element, the lower end thereof being secured to the seat.

7. The baby walker of claim 6 including a longitudinal bar secured to the cross bar and extending under the seat, and a connection between the longitudinal bar and the seat.

8. The baby walker of claim 6 including a longitudinal stabilizing bar secured to the cross bar and extending under the seat, a lost motion connection between the longitudinal bar and seat, a pusher handle and detachable connection therefor to the longitudinal bar.

9. A device of the class described comprising a wheeled shaft, a spring rod frame in the form of three open loops, one of the loops being central and generally horizontal and the other two loops depending therefrom and extending reversely thereto, said two loops being generally vertical, the wheeled shaft being secured to the vertical loops at their closed ends adjacent the open end of the horizontal loop, wheeled means connected to and supporting the frame at a point remote from the shaft, a seat suspended from the horizontal loop at the closed end thereof, and seat supporting means secured to the seat and to the frame adjacent the open end of the horizontal loop.

WILLIAM C. TROENDLE.

REFERENCES CITED

The following references are of record in the file of this patent:

UNITED STATES PATENTS

| Number | Name | Date |
|---|---|---|
| 349,629 | Burton | Sept. 21, 1886 |
| 1,557,264 | Millen | Oct. 13, 1925 |
| 2,347,754 | Shay | May 2, 1944 |
| 2,392,938 | McGregor | Jan. 15, 1946 |